United States Patent
Finnegan et al.

(10) Patent No.: US 9,835,412 B1
(45) Date of Patent: Dec. 5, 2017

(54) HOLOGRAPHIC SPORTING/COMBAT OPTIC WITH RETICLES RECORDED AT DIFFERENT DISTANCES

(71) Applicant: Elite Arms, Chelsea, MI (US)

(72) Inventors: Dennis Finnegan, Pinckney, MI (US); Dean Loebig, Howell, MI (US); Frank H. Moss, III, Woodhaven, MI (US)

(73) Assignee: Elite Arms, Chelsea, MI (US)

( * ) Notice: Subject to any disclaimer, the term of this patent is extended or adjusted under 35 U.S.C. 154(b) by 0 days.

(21) Appl. No.: 15/406,101

(22) Filed: Jan. 13, 2017

(51) Int. Cl.
| | | |
|---|---|---|
| *G02B 5/32* | (2006.01) | |
| *F41G 1/00* | (2006.01) | |
| *F41G 1/30* | (2006.01) | |
| *G02B 27/34* | (2006.01) | |
| *G02B 27/36* | (2006.01) | |
| *G03H 1/22* | (2006.01) | |
| *G03H 1/00* | (2006.01) | |
| *F41G 1/34* | (2006.01) | |
| *F41G 1/467* | (2006.01) | |

(52) U.S. Cl.
CPC ............ *F41G 1/30* (2013.01); *F41G 1/345* (2013.01); *G02B 27/34* (2013.01); *G02B 27/36* (2013.01); *G03H 1/0005* (2013.01); *G03H 1/2249* (2013.01); *F41G 1/467* (2013.01); *G03H 2001/2281* (2013.01); *G03H 2222/12* (2013.01)

(58) Field of Classification Search
CPC ... F41G 1/30; F41G 1/345; F41G 1/00; G02B 5/32; G02B 23/10

USPC .... 42/111–116; 359/1, 15, 340, 13, 19, 424, 359/398
See application file for complete search history.

(56) References Cited

U.S. PATENT DOCUMENTS

| | | | | |
|---|---|---|---|---|
| 3,915,548 | A | * | 10/1975 | Opittek ................. G02B 27/01 345/7 |
| 5,483,362 | A | * | 1/1996 | Tai ............................ F41G 1/30 359/1 |
| 5,815,936 | A | | 10/1998 | Sieczka et al. |
| 5,901,452 | A | * | 5/1999 | Clarkson ................ F41G 1/345 42/131 |
| 6,490,060 | B1 | | 12/2002 | Tai et al. |
| 2006/0162226 | A1 | * | 7/2006 | Tai ............................ F41G 1/30 42/132 |
| 2011/0228366 | A1 | * | 9/2011 | Liu ........................... F41G 1/30 359/15 |
| 2013/0333266 | A1 | * | 12/2013 | Gose ........................ F41G 1/00 42/111 |
| 2015/0267997 | A1 | * | 9/2015 | Collin .................. G03H 1/0005 359/1 |

(Continued)

Primary Examiner — Michael David
(74) Attorney, Agent, or Firm — Harness, Dickey & Pierce, P.L.C.

(57) ABSTRACT

A holographic sporting/combat optic may be mounted to weapon. The holographic sporting/combat optic includes a laser diode, a holographic recording element and one or more optical components arranged in a housing. In response to a light beam incident thereon, the holographic recording element projects a composite, multidimensional reticle image into the optical viewing window. Of note, the holographic recording element has two or more reticle elements recorded thereon which form the composite reticle image. Each of the two or more reticle elements is captured at a different distance from the weapon during different exposures of the holographic recording element.

14 Claims, 7 Drawing Sheets

(56) References Cited

U.S. PATENT DOCUMENTS

2015/0362651 A1* 12/2015 Voloschenko .......... G02B 5/32 359/9
2016/0377377 A1* 12/2016 Collin ...................... F41G 1/30 42/113

* cited by examiner

HOLOGRAPHIC SPORTING/COMBAT OPTIC WITH RETICLES RECORDED AT DIFFERENT DISTANCES

FIELD

The present disclosure relates to holographic sporting/combat optics with enhanced reticles.

BACKGROUND

Holographic sporting/combat optic is a non-magnifying weapon sight that allows the user looking through an optical viewing window to see a reticle superimposed at a specific distance in the field of view. The reticle is a three-dimensional holographic image recorded on a holographic recording medium. The reticle is formed when a light beam is projected through the holographic recording medium. Conventional holographic sporting/combat optics are not parallax free at more than one single distance at which the holographic element's image was captured. Rather, when the user moves their head laterally behind the sight, an error is introduced between the reticle and the optical axis of the sight at any other distance than that at which the holographic element's image was captured. Therefore, it is desirable to provide a holographic sporting/combat optic that reduces or eliminates parallax at more than one distance in space.

It would also be desirable to enhance use of the holographic sporting/combat optic by integrating ballistic reference data as well as other information into the holographic images projected by the holographic recording element.

This section provides background information related to the present disclosure which is not necessarily prior art.

SUMMARY

This section provides a general summary of the disclosure, and is not a comprehensive disclosure of its full scope or all of its features.

In one aspect, a holographic sporting/combat optic is presented which is suitable for use with a particular weapon. The optic includes: a housing defining an optical viewing window and configured to mount to a weapon; a laser diode supported in the housing and operable to emit a beam of light; a holographic recording element that projects a composite reticle image in the optical viewing window in response to a light beam incident thereon; and one or more optical components arranged in the housing to direct the beam of light from the laser diode onto the holographic recording element. The holographic recording element includes two or more reticle elements recorded thereon and forming the composite reticle image, such that the two or more reticle elements are captured during different exposures of the holographic recording element and at a different distances from the weapon.

In another aspect, the holographic recording element projects a composite reticle image along a line of sight axis in the optical viewing window as well as projects ballistic reference data in the optical viewing window but outside of a viewing area of the target scene that surrounds the composite reticle image. The composite reticle image may be recorded on a first plane of the holographic recording element; whereas, the ballistic reference data may be recorded on a second of the holographic recording element that differs from the first plane. The ballistic reference data may include a descriptor for the particular weapon and, for each of the two or more reticle elements, an indicia for a given reticle element and a corresponding distance at which the given reticle element was captured at when recorded on the holographic recording element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
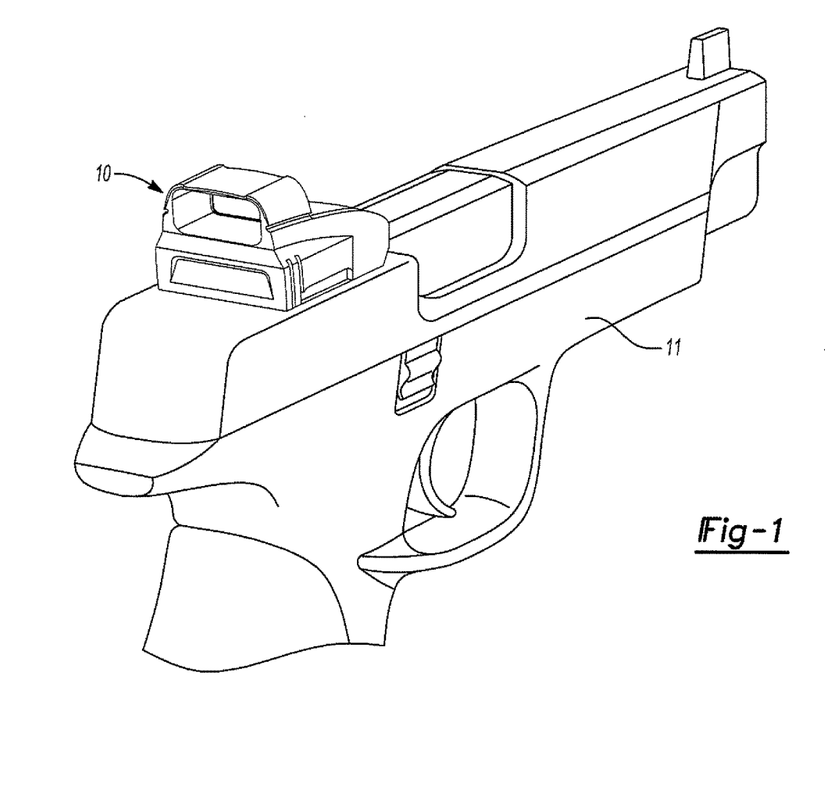
FIG. 1 is a diagram of a holographic sporting/combat optic mounted on a weapon.
Figure 2:
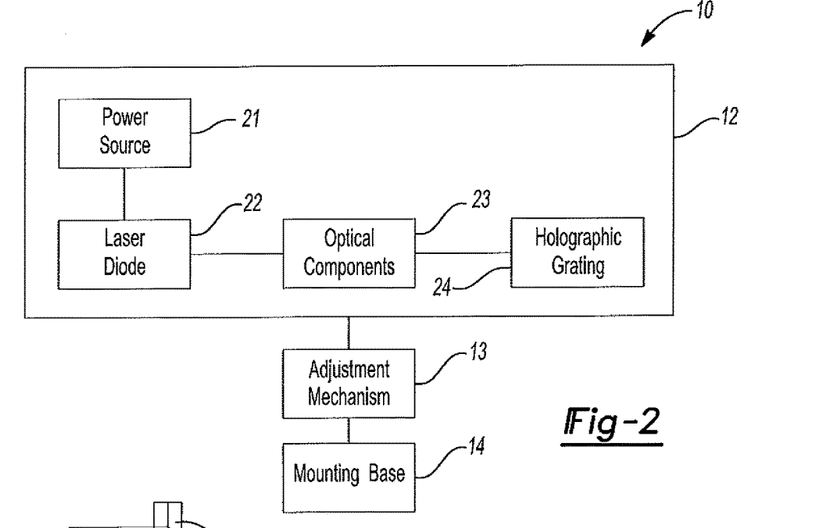
FIG. 2 is a block diagram depicting the core components which comprise the holographic sporting/combat optic.

Referring to FIGS. 1 and 2, a holographic sporting/combat optic 10 is shown mounted to a weapon 11. The holographic sporting/combat optic 10 allows a user to look through an optical viewing window 8 and projects a reticle image into the field of view as seen through the optical viewing window. A housing 12 of the holographic sporting/combat optic 10 defines an interior chamber for housing optical components therein. A mounting base 14 is provided on the bottom of the housing 12 and functions to attach the holographic sporting/combat optic 10 to the weapon. Various types of attachment methods may be employed depending upon the type of weapon. While the weapon is shown as a handgun, it is readily understood that the holographic sporting/combat optic 10 may be suitable for use with other types of weapons, including a rifle, a bow, etc.

Within the housing 12, the holographic sporting/combat optic 10 includes a laser diode 22, one or more optical components 23 and a holographic recording medium 24. The laser diode 22 is powered by a power source 21, such as a battery, and operates to emit a beam of light. In the response to a light beam incident thereon, the holographic recording medium 24 projects a reticle image into the optical viewing window of the holographic sporting/combat optic 10. One or more optical components 23 are used to direct the beam of light from the laser diode 22 onto the holographic recording medium 24. Example optical components include but are not limited to mirrors, lens, diffraction gratings, etc.

An adjustment mechanism 13 is interfaced between the housing 12 and the mounting base 14. The adjustment mechanism 13 enables the user to move the housing 12 relative to the mounting base 14. More specifically, the adjustment mechanism includes a subassembly for adjusting elevational angle of the housing and another subassembly for adjusting azimuth angle of the housing. Different types of mechanical or electro-mechanical mechanisms are known in the art and may be implemented in the holographic weapons sight 10.

Figure 3:
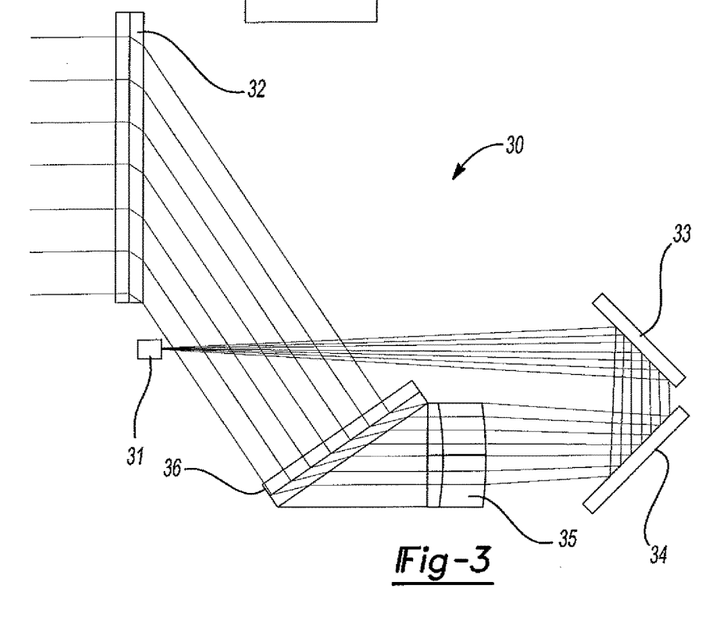
FIG. 3 is a diagram depicting an example embodiment of an optical subsystem for use in the holographic sporting/combat optic.

FIG. 3 illustrates an optical subsystem 30 for a holographic sporting/combat optic 10. In general, the optical subsystem includes a light source 31, a holographic recording element 32 and one or more optical components. During operation, the light source 31 emits a beam of light. In response to the light beam being incident thereon, the holographic recording element 32 projects a composite reticle image into the optical viewing window 8 of the holographic sporting/combat optic 10. One or more optical components, such as mirrors, lens and diffraction gratings, are arranged in the housing to direct the light beam from the light source onto a surface of the holographic recording element.

In an example embodiment of the optical subsystem 30, the light source is further defined as a laser diode. The light beam from the laser diode is directed towards two folding mirrors 33, 34 which cooperate to redirect the light beam towards a collimating lens 35. The collimated beam from the collimating lens is then directed towards the holographic recording element 32. In some embodiments, the collimating beam may pass through a diffraction grating 36 before reaching the holographic recording element 32. In response to the collimated beam being incident thereon, the holographic recording element 32 projects a hologram of a reticle. It is to be understood that only the relevant optical components are discussed in relation to FIG. 3, but that other components may be incorporated in the holographic sporting/combat optic 10.

Figure 4A:
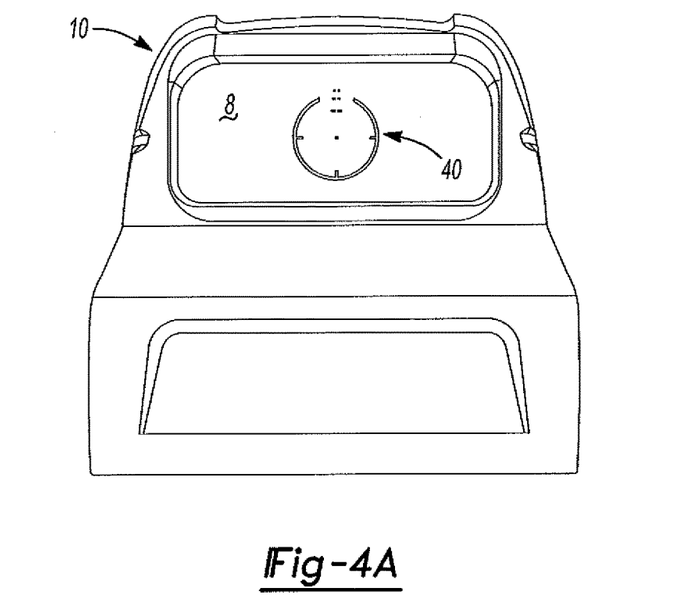
FIGS. 4A-4C are diagrams depicting a first example embodiment of a reticle image produced by the holographic sporting/combat optic.
Figure 4B:
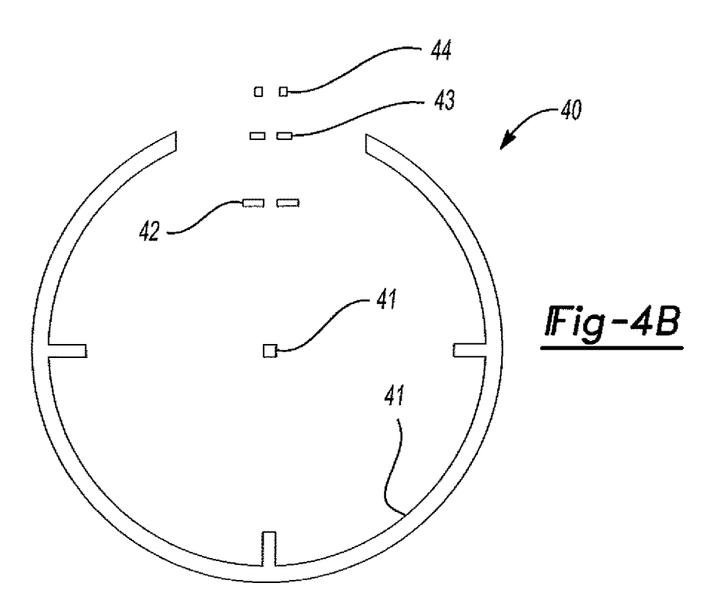
Figure 4C:
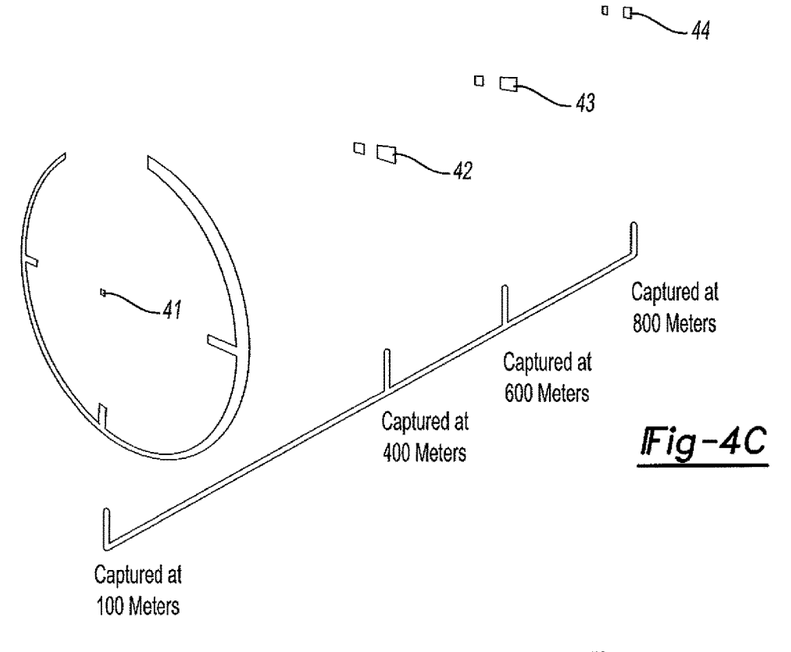

With reference to FIGS. 4A-4C, the composite reticle image 40 projected by the holographic sporting/combat optic 10 is comprised of two or more reticle elements. In an example embodiment, the composite reticle image 40 includes a first reticle element 41, a second reticle element 42, a third reticle element 43 and fourth reticle element 44. Each reticle element preferably includes multiple markings. For example, the first reticle element 41 may be a center dot surrounded by a circle; whereas, the second reticle element 42, the third reticle element 43 and fourth reticle element 44 may be two dashes (or dots, chevrons, arrows or other geometric shape) positioned at different spacing above or below the center dot. More importantly, each of these four reticle elements is captured at a different distance from the weapon during different exposures of the holographic recording element. The reticle elements can be recorded onto the holographic recording element 32 using holographic image multiplexing. In some embodiments, one or more reticle elements may be positioned above the center dot while other reticle elements are positioned below the center dot. In other embodiments, reticle elements above the center dot are reference points for one type of weapon; whereas, reticle elements below the center dot are reference points for another type of weapon. It is understood that a composite reticle image 40 can include more or less than four reticle elements.

Figure 5A:
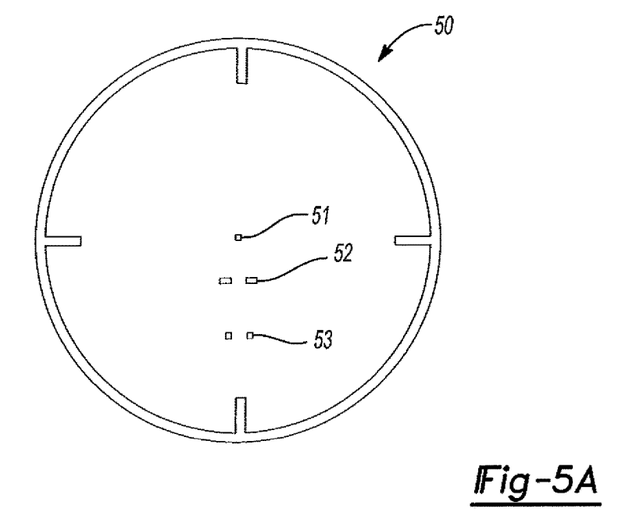
FIGS. 5A and 5B are diagrams depicting a second example embodiment of a reticle image produced by the holographic sporting/combat optic.
Figure 5B:
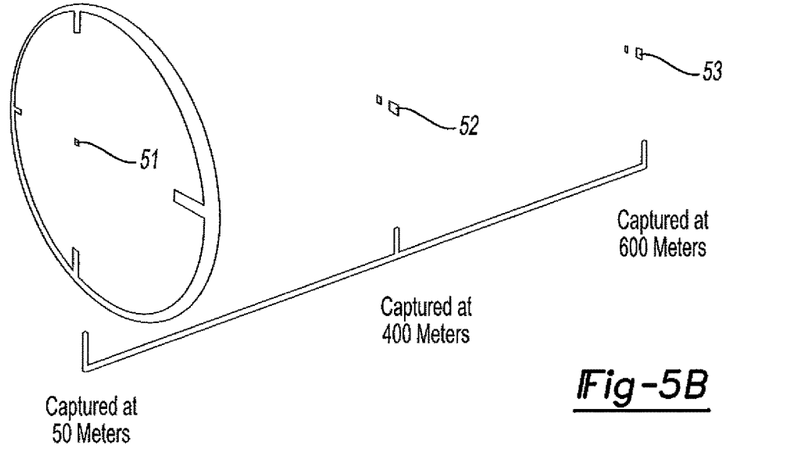

More specifically, each reticle element (i.e., layer) is captured at whatever distance is required to align that layer with a ballistic reference point. For example, if the center reference dot's effective distance is 100 meters, the dot's layer would be captured at that distance. If the second reference dashes are accurate at 400 meters, those dashes are captured at that distance (and so on). As seen in FIG. 4C, the first reticle element 41, the second reticle element 42, the third reticle element 43 and the fourth reticle element 44 are captured at 100 meters, 400 meters, 600 meters and 800 meters, respectively. In another example, the composite reticle image 50 includes only three reticle elements as seen in FIGS. 5A and 5B. In this example, the first reticle element 51, the second reticle element 52, and the third reticle element 53 are captured at 50 meters, 400 meters, and 600 meters, respectively. These distances are merely illustrative and may vary in different embodiments.

When the user observes the composite reticle image directly through the optic's line of sight, the user sees one reticle image 40, with various ballistic reference points that exist at their individually captured distances, thereby minimizing or eliminating parallax when aimed at targets at those distances. In other words, different parts of a single composite reticle image 40 are captured in the recording material 32 at different times, and each time records its particular set of ballistic data at its own specific distance (relative to the selected ballistic characteristics of a chosen weapon platform and type of ammunition). Each reference point captured in space would exhibit parallax as a real object would at that distance. Subsequently, when the user aligns the ballistic reference point with a target at the same or a similar distance, the reference point's location at the target plane would significantly reduce or eliminate the overall impact of parallax on the user's accuracy and ability to hit the target.

Reticles are preferably designed to correspond to known ballistic reference points for a particular weapon. In the example embodiment, each reticle element in the composite reticle image corresponds to ballistic reference points for the same weapon platform. For a given weapon platform and ammunition type, a ballistic reference point may be defined as a distance from the weapon (along the line of sight axis) and an expected deviation (e.g., drop distance) by a projectile fired by the weapon from the line of sight axis at the corresponding distance. It is readily understood that the placement of the reticle elements compensate for the corresponding drop distance. In other embodiments, the reticle elements correspond to a known blast radius or a known trajectory arc for a particular explosive ammunition. Ballistic reference points can also include height above bore, barrel type and length, or ambient weather conditions.

By way of example, a composite reticle image may be designed for use with a M4 carbine (having 14.5" barrel with a 1/7 twist) using M855 ammo (i.e., 5.56×45 mm NATO ammunition). Known ballistic reference points for this weapon platform are set forth in the chart below.

| M855 Ball, M4 | | |
| --- | --- | --- |
| Mark | Distance | Compensated Drop |
| Center | 100 meters | 0" |
| Up 1 | 400 meters | 27" |
| Up 2 | 600 meters | 92.3" |

A different reticle image may be designed for use with a M240L medium machine gun (having 20.8" barrel with 1/12 twist) using M80 ball ammo (i.e., 7.62×51 mm NATO ammunition); ballistic reference points for this weapon platform are set forth in the chart below.

| M80 Ball, M240L | | |
|---|---|---|
| Mark | Distance | Compensated Drop |
| Center | 100 meters | 0" |
| Up 1 | 400 meters | 32.5" |
| Up 2 | 600 meters | 101.9" |
| Up 3 | 800 meters | 235.4" |

For illustration purposes, ballistic reference points for two additional weapon platforms are also set forth below. First, ballistic reference points for a M2 Browning machine gun (45" barrel with a 1/15 twist) using M33 ball ammo (i.e., 12.7×99 mm NATO ammunition) is as follows.

| M33 Ball, M2 | | |
|---|---|---|
| Mark | Distance | Compensated Drop |
| Center | 100 meters | 0" |
| Up 1 | 400 meters | 22.1" |
| Up 2 | 600 meters | 64" |
| Up 3 | 800 meters | 133.6" |
| Up 4 | 1000 meters | 237.9" |

Second, ballistic reference points for a 30.06 Springfield Model 700 hunting rifle (24" barrel with a 1/10 twist) using 150 grain Hornady SP Interlock bullet (i.e., 30.06 Springfield ammunition) is as follows.

| 30.06 Springfeld, Model 700 | | |
|---|---|---|
| Mark | Distance | Compensated Drop |
| Center | 100 meters | 0" |
| Up 1 | 400 meters | 30.5" |
| Up 2 | 600 meters | 96.4" |
| Up 3 | 800 meters | 224.5" |

From these examples, it is readily understood how different composite reticle images can be implemented with reticle elements corresponding to different ballistic reference points for a particular weapon platform. The weapon platforms and ballistic reference points are merely illustrative and not intended to limit the scope of this disclosure.

Figure 6A:
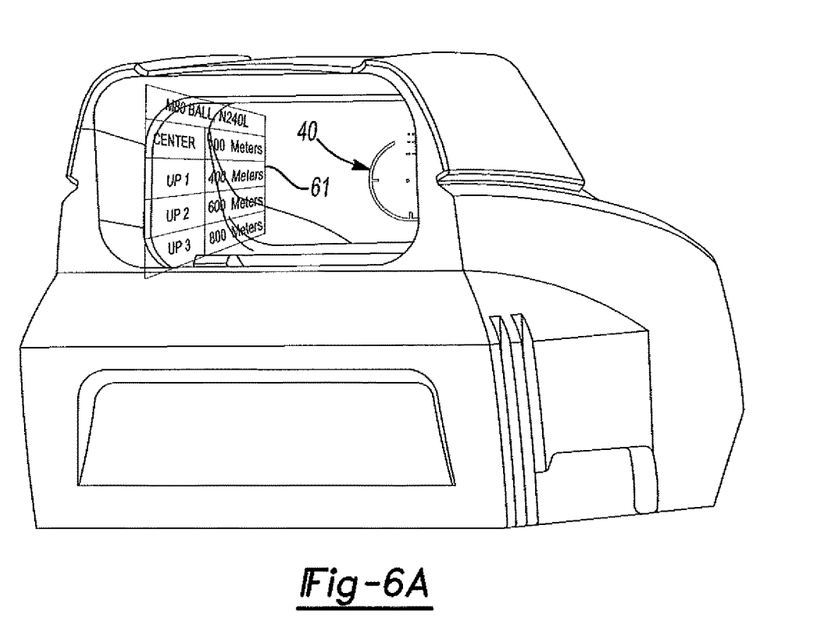
FIGS. 6A and 6B are diagrams illustrating ballistic reference data integrated into the image projected by the holographic sporting/combat optic.
Figure 6B:
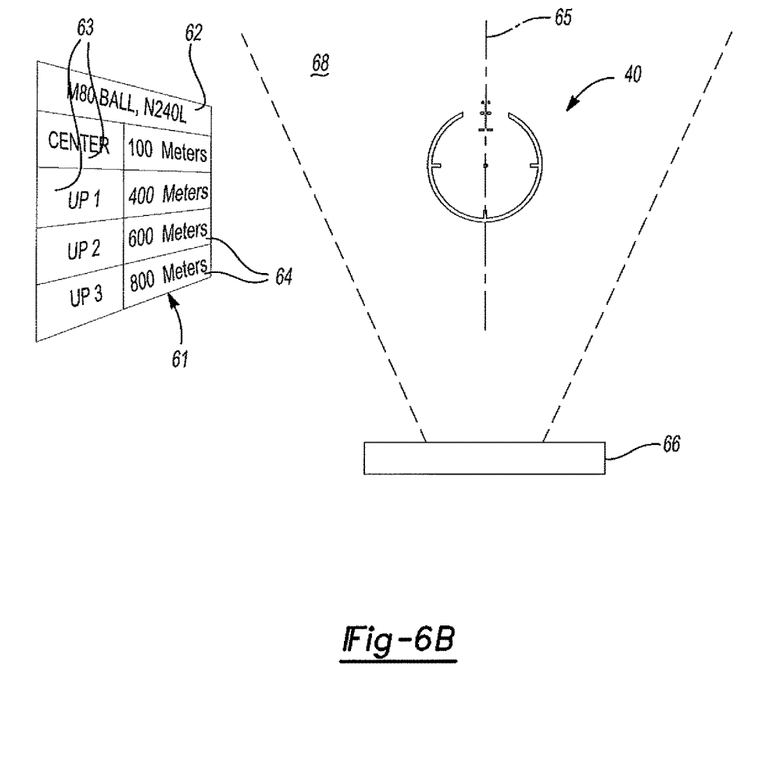

In another aspect of this disclosure, ballistic reference data as well as other data may be integrated into the image projected by the holographic recording element. In one example embodiment, a ballistic table 61 is displayed adjacent to the reticle image 40 as seen in FIGS. 6A and 6B. The ballistic table 61 presents ballistic reference data for a particular weapon. In the example embodiment, the ballistic table 61 presents ballistic reference data for each of the reticle elements in the adjacent composite reticle image 40. The ballistic reference data may include but is not limited to a descriptor 62 for the particular weapons and, for each reticle element, an indicia for the given reticle element 63 and a corresponding distance 64 at which the given reticle element was captured. In FIG. 6, the ballistic reference data is for a M240L medium machine gun and includes four reference points at 100 meters, 400 meters, 600 meters and 800 meters. In this case, indicia 63 for the reference points is "center" for the center dot, "Up 1" for the reticle element immediately above the center dot, "Up 2" for the reticle element two removed from the center dot and so on.

In another example, the ballistic table 61 may include a descriptor for the particular weapons, an indicia for two or more reticle elements and a corresponding distance at which the reticle element was captured. Indicia for reference point may also take the form of a graphical representation of the reticle. Other types of indicia are also contemplated by this disclosure. Likewise, the ballistic reference data may include other data elements and may be presented in forms other than a table.

The holographic sporting/combat optic 10 defines a line of sight axis 65 through the optical viewing window 66, such that the line of sight axis aligns with the center dot of the reticle image and is parallel with a longitudinal axis of barrel of the weapon. The ballistic reference data is offset from the line of sight axis in the optical viewing window. For example, a viewing area of the target scene surrounds the composite reticle image and may be defined, for example as 45 degrees either side of the line of sight axis (i.e., 90 to 135 degrees). The ballistic reference data can be projected in an area that is offset 45 to 90 degrees from the line of sight axis (i.e., assuming a 90 degree field of view with the line of sight axis at the midpoint). That is, the ballistic reference data may be projected to the left of the field of view (i.e., 0 to 45 degrees) or to the right of the field of view (i.e., 135 to 180 degrees). In this way, the ballistic reference data 61 is projected outside of a viewing area 68 that surrounds the composite reticle image 40 as indicated in FIG. 6B. Holographic image multiplexing allows large format, 3D patterns to be recorded and projected with no distortion or field curvature. This creates the ability to incorporate off-axis ballistic tables or other reference imagery in alignment with or out of alignment with the line of sight axis of the target scene through any type of optic incorporated in the holographic sporting/combat optic 10.

Figure 7:
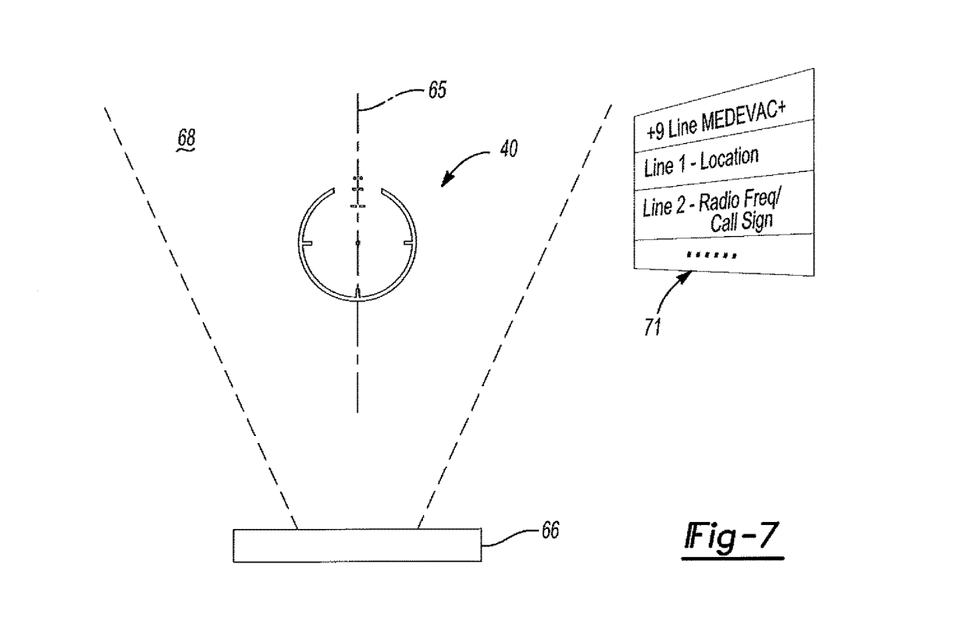
FIG. 7 is a diagram illustrating other types of data that may be integrated into the image projected by the holographic sporting/combat optic.

Furthermore, other types of data or images may be displayed in place of or in addition to the ballistic reference data. For example, a "9 line MEDEVAC report" may be displayed opposite of a ballistic table as shown in FIG. 7. Logos or other marketing images may be projected by the holographic recording element. These examples are merely illustrative of the different types of information that may be displayed off-axis in conjunction with the composite reticle image.

Figure 8:
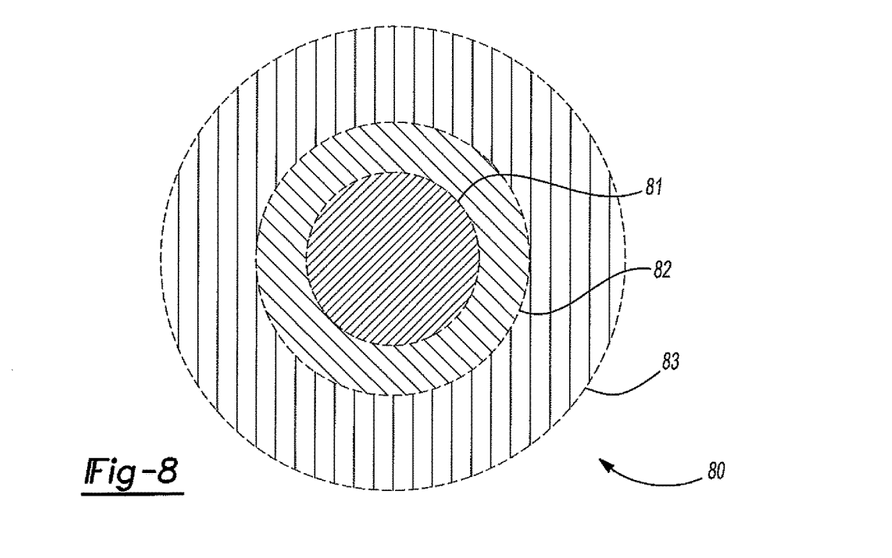
FIG. 8 is a diagram depicting a different embodiment of a reticle image produced by the holographic sporting/combat optic illustrating.

In a different embodiment, the reticle elements in a composite reticle may be rings demonstrating blast radii of explosive ammunition. Referring to FIG. 8, the composite reticle 80 may be comprised of three rings that simulate the blast radius of a particular explosive ammunition, such as a M799 high explosive incendiary. In this example, the three rings define three different zones: kill, maim and safe. The kill zone is defined by the inner circle 81, the maim zone is defined by the middle ring 82 and the safe zone is defined by the outer ring 83. The composite reticle 80 may include a text label for each zone. Each zone could also be highlighted, for example with a different transparent shading or coloring. Distances signify the outer boundary for each corresponding zone when the ammunition is exploded at a predefined distance from the weapon. In this example, the three rings are captured and recorded onto the holographic recording element 32 at one predefined distance. It is understood that the distances of the boundaries may vary depending on the distance at which the ammunition exploded from the weapon.

Alternatively, the rings of the composite reticle 80 may be captured at different distances from the weapon during different exposures of the holographic recording element 32. In this case, each ring indicates the blast radius for the particular explosive ammunition at the recorded distance. For example, the inner circle indicates the blast radius when the ammunition is exploded at 3000 meters, the middle ring indicates the blast radius when the ammunition is exploded at 2000 meters and the outer ring indicates the blast radius when the ammunition is exploded at 1000 meters. For each zone, the composite reticle may also include a text label indicating the recorded distance. This enables to the user to be aware of the potential impact at the recorded distance and avoid unwanted damage.

To further help understand the implications of the explosion at each recorded distance from the weapon, a ranging table can also be presented off-axis. An example ranging table is set forth below.

| M799 High Explosive Incendiary (HEI) Blast Radius Reticle | |
| --- | --- |
| Ring | Distance |
| Inner Ring | 3000 meters |
| Middle Ring | 2000 meters |
| Outer Ring | 1000 meters |

Additionally or alternatively, each zone in the composite reticle could be highlighted, for example with a different transparent shading or coloring. For example, the inner circle could be highlighted red, the middle ring could be highlight blue and the outer ring could be highlights green.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A holographic sporting/combat optic suitable for use with a particular weapon, comprising:
   a housing defining an optical viewing window and configured to mount to the particular weapon;
   a laser diode supported in the housing and operable to emit a beam of light;
   a holographic recording element projects a composite reticle image in the optical viewing window and along a line of sight axis in response to a light beam incident thereon, the holographic recording element having two or more reticle elements recorded thereon and forming the composite reticle image, such that the two or more reticle elements are captured during different exposures of the holographic recording element and at different distances from the particular weapon; and
   one or more optical components arranged in the housing to direct the beam of light from the laser diode onto the holographic recording element.

2. The holographic sporting/combat optic of claim 1 wherein each of the two or more reticle elements recorded on the holographic recording element corresponds to a known ballistic reference point for the particular weapon.

3. The holographic sporting/combat optic of claim 1 wherein one of the two or more reticle elements corresponds to a known ballistic reference point for a first weapon and another of the two or more reticle elements corresponds to a known ballistic reference point for a second weapon that differs from the first weapon.

4. The holographic sporting/combat optic of claim 1 wherein each of the two or more reticle elements recorded on the holographic recording element corresponds to a known blast radius or a known trajectory arc for a particular explosive ammunition.

5. The holographic sporting/combat optic of claim 1 the holographic recording element has ballistic reference data for the particular weapon recorded thereon and projects the ballistic reference data in the optical viewing window but outside of a viewing area of the target scene that surrounds the composite reticle image.

6. The holographic sporting/combat optic of claim 5 wherein the ballistic reference data includes a descriptor for the particular weapon and, for each of the two or more reticle elements, an indicia for a given reticle element and a corresponding distance at which the given reticle element was captured at when recorded on the holographic recording element.

7. The holographic sporting/combat optic of claim 1 wherein the viewing area of the target scene is defined 45 degrees either side of the line of sight axis and the ballistic reference data is projected in an area offset more than 45 degrees from the line of sight axis.

8. The holographic sporting/combat optic of claim 1 wherein the one or more optical components includes a collimating lens configured to receive the light beam from the laser diode and collimate the light beam, and a diffraction grating configured to receive the collimated light beam from the collimating lens and direct the collimated light beam towards the holographic recording element.

9. A holographic sporting/combat optic suitable for use with a particular weapon, comprising:
  a housing defining an optical viewing window and configured to mount to the particular weapon;
  a laser diode supported in the housing and operable to emit a beam of light;
  a holographic recording element, in response to a light beam incident thereon, projects a composite reticle image along a line of sight axis in the optical viewing window and projects ballistic reference data for the particular weapon adjacent to the composite reticle image, wherein the composite reticle image is recorded on a first plane of the holographic recording element and the ballistic reference data is recorded on a second plane of the holographic recording element that differs from the first plane; and
  one or more optical components arranged in the housing to direct the beam of light from the laser diode onto the holographic recording element.

10. The holographic sporting/combat optic of claim 9 wherein the holographic recording element has at least two reticle elements forming the composite reticle image, such that each of the at least two reticle elements is captured at a different distance from the particular weapon.

11. The holographic sporting/combat optic of claim 10 wherein the ballistic reference data includes an indicia for each of the at least two reticle elements and a corresponding distance at which the reticle element was captured when recorded on the holographic recording element.

12. The holographic sporting/combat optic of claim 9 wherein the ballistic reference data includes a descriptor for the particular weapon.

13. The holographic sporting/combat optic of claim 12 wherein the ballistic reference data further includes a type of ammunition, a distance from the particular weapon, and a measure of deviation from the line of sight axis at the corresponding distance by a projectile fired by the particular weapon.

14. The holographic sporting/combat optic of claim 10 wherein each of the two or more reticle elements recorded on the holographic recording element corresponds to a known blast radius or a known trajectory arc for a particular explosive ammunition.

* * * * *